(12) United States Patent
Tholfsen et al.

(10) Patent No.: US 12,235,916 B2
(45) Date of Patent: Feb. 25, 2025

(54) INSIGHTS SERVICE FOR SEARCH ENGINE UTILIZATION

(71) Applicant: Microsoft Technology Licensing, LLC, Redmond, WA (US)

(72) Inventors: Michael Tholfsen, Newcastle, WA (US); Paul Ronald Ray, Kirkland, WA (US); Elad Graiver, Tel-Aviv (IL); Yonatan Turkin, Givatayim (IL); Jonathan Thomas Grudin, Issaquah, WA (US); Sadiq Dhafir Alkhalili, Burnaby (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

(21) Appl. No.: 18/145,599

(22) Filed: Dec. 22, 2022

(65) Prior Publication Data

US 2024/0211520 A1   Jun. 27, 2024

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......................... G06F 16/9535; G06F 16/9538
See application file for complete search history.

(56) References Cited

U.S. PATENT DOCUMENTS

| | | | |
|---|---|---|---|
| 8,037,042 B2 | 10/2011 | Anderson et al. | |
| 8,099,412 B2 | 1/2012 | Yan et al. | |
| 8,375,452 B2 | 2/2013 | Raviv | |
| 9,262,767 B2 | 2/2016 | Sercinoglu et al. | |
| 9,703,871 B1 * | 7/2017 | Das | G06F 16/3338 |
| 9,953,185 B2 | 4/2018 | Bendersky et al. | |
| 10,810,256 B1 | 10/2020 | Goldberg | |
| 2003/0120589 A1 | 6/2003 | Williams | |
| 2006/0026147 A1 * | 2/2006 | Cone | G06F 16/9538 |
| 2013/0110803 A1 * | 5/2013 | Mikalsen | G06F 16/9538 707/706 |
| 2013/0260356 A1 | 10/2013 | Kutty | |

(Continued)

FOREIGN PATENT DOCUMENTS

JP  2006079454 A  3/2006

OTHER PUBLICATIONS

"Understanding User Behavior with Google Analytics", Retrieved from: https://web.archive.org/web/20190417094257/https:/support.google.com/analytics/answer/7126596?hl=en, Apr. 17, 2019, 5 Pages.

(Continued)

*Primary Examiner* — Apu M Mofiz
*Assistant Examiner* — Oscar Wehovz

(57) ABSTRACT

A method of operating a search service includes observing, on a per-user basis with respect to each user in a group of users, usage of features of a search engine over a period of in association with search queries submitted to the search engine. The method continues with identifying, on a per-user basis with respect to each of the group of users, one or more insights into the usage of the features over the period of time. The service may then enable display of the one or more insights in a user interface.

20 Claims, 14 Drawing Sheets

(56) References Cited

U.S. PATENT DOCUMENTS

| | | | |
|---|---|---|---|
| 2014/0335497 A1* | 11/2014 | Gal | G09B 7/00 |
| | | | 434/323 |
| 2015/0262077 A1* | 9/2015 | White | G06N 20/00 |
| | | | 706/12 |
| 2016/0266779 A1* | 9/2016 | Sheldon | G06Q 10/10 |
| 2018/0246967 A1* | 8/2018 | Hill | G06F 16/951 |
| 2020/0234606 A1 | 7/2020 | Anders | |
| 2022/0108413 A1 | 4/2022 | Hack | |
| 2024/0220553 A1 | 7/2024 | Tholfsen | |

OTHER PUBLICATIONS

November, Alan, "Mission Critical: How Educators Can Help Save Democracy", Retrieved From: https://novemberlearning.com/article/mission-critical-educators-can-help-save-democracy/, Dec. 22, 2016, 5 Pages.

Non-Final Office Action issued in U.S. Appl. No. 18/148,563, mailed on May 20, 2024, 9 Pages.

Notice of Allowance mailed on Nov. 20, 2024 in U.S. Appl. No. 18/148,563, 9 pages.

\* cited by examiner

INSIGHTS SERVICE FOR SEARCH ENGINE UTILIZATION

TECHNICAL FIELD

Aspects of the disclosure are related to the field of computer software applications and services and, in particular, to search engine tools and insights.

BACKGROUND

Search engines are powerful software tools that allow users to search the Internet for particular information related to a topic of inquiry. Search results are often presented in a list of links on a webpage that a user scrolls through and selects to navigate through to the source of an article, image, video, research paper, infographic, or the like. Users can instantly access a vast assortment of information related to a particular topic simply by querying a search engine using terms that describe the topic.

While the speed and convenience provided by search engines are remarkable, many users struggle to construct effective queries. In fact, much of the time users simply type or utter simple statements or questions into a search engine interface without any concern for or knowledge of how the structure of their query will impact the results returned by the search engine. The very nature of most search interfaces—a simple text box into which one inputs a word or phrase—lends itself to queries that lack focus and direction. As a result, the results returned for many searches are ineffective or worse—misleading.

In a frequent example, a user seeking information about a malady may input a search query that references the malady. However, depending upon the phrasing of the query, a given search engine is likely to return results that are weighted towards opinion articles, as opposed to factual articles that inform the user about the malady. In another example, a user may seek information on a controversial topic, in response to which a search engine presents results without any regard for the trustworthiness or validity of the results. Again, depending upon the phrasing of the query, a search engine may return results that are weighted toward addressing the topic in a particular manner.

In addition to the challenges discussed above, even searches for the most benign topics can produce results that are simply too scattered or unfocused to be of much use to a user. Indeed, it is common for users to repeatedly redo their searches in an effort to find better results, resulting in a waste of time on their part, and a waste of resources on a global scale with respect to the compute resources needed to perform the searches.

SUMMARY

Technology disclosed herein includes a service that provides insights into the usage of search engine capabilities, thereby improving user proficiency with Internet searches and reducing wasteful and ineffective queries. The insights may be provided to a person engaged in a supervisory or instructional role with respect to a group of users conducting searches, as well as to the individuals of the group themselves. In fact, the provided insights are just as applicable to individual users separate from any group or instructional context. For example, an individual user may desire and benefit from insights provided with respect to Internet searches conducted by the user.

In an implementation, a method of operating a search service includes observing, on a per-user basis with respect to each user in a group of users, usage of features of a search engine in association with queries submitted to the search engine over a period of time. The method continues with identifying, on a per-user basis with respect to each of the group of users, one or more insights into the usage of the features over the period of time. The service may then enable display of the one or more insights in a user interface.

In various implementations, users engage with the search engine via instances of an application that include controls corresponding to the features. The controls are selectable by user input to refine queries being constructed in a search box of the application. Example features include filter operators such as a Boolean operator, a domain operator, a region operator, and a timeframe operator. The controls may include a Boolean control selectable to employ the Boolean operator, a domain control selectable to employ the domain operator, a region control selectable to employ the region operator, and a timeframe control selectable to employ the timeframe operator.

Example insights include an insight indicative of a progress of each of the group of users with respect to using one or more of the features of the search engine. The insights may also include an insight indicative of a rate of click-throughs to resources identified in the search results.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIGS. 6A-6H illustrate a user experience in an implementation.

DETAILED DESCRIPTION

Technology disclosed herein is generally directed to providing search insights for visualizing search progress across individuals and groups, such as students. Searching trends of individuals and/or groups are displayed, e.g., to an instructor, who receives a holistic view of searching activities, including how often only a first search result was selected, search terms and feature usage, web sites accessed, and popular search terms (e.g., in a word cloud). Providing the insights allows an instructor to coach an end user (or allows individuals themselves to learn) to use the full capabilities of a search engine more proficiently.

In various implementations, a software application on a computing device communicates with an online service to obtain insight information indicative of the progress (or lack thereof) of users with respect to search activities. The application displays the insights in a manner that allows a user to review progress of the group as a whole, as well as to drill-down into the data on a per-user basis. The user experience provided by the application allows a reviewing user to quickly and easily understand the progress that an individual user is making with respect to their proficiency with search engine features when constructing queries. For example, a reviewing user is able to view the progress of an individual with respect to constructing queries using various filter operators or other such features of a search engine. Examples of reviewing users include teachers, managers, or other such personnel in reviewing positions. In some cases, a reviewing user may be in a supervisory position, although a reviewing user need not be a supervisory with respect to an observed user.

Various technical effects that result from the generation and delivery of search insights as disclosed herein may be apparent. At a high level, the insights provided to individual users form the basis for improved instruction with respect to searching skills and techniques. The improved instruction, when applied to target users, results in improved search queries. In turn, the improved search queries reduce search churn by driving improved search results. For example, the search results may be more factual (less weighted towards opinion), more accurate (less misleading), and overall, of a higher quality than without such improvements.

In the aggregate, a reduction in search churn reduces the compute resources required of the search engines that perform the searches. A reduction in search churn may reduce demand on a global scale for the energy required to power modern search engines. At a more local level, reduced search churn consumes less battery power (e.g., on mobile devices) since fewer searches are needed, to say nothing of improving the basic user experience with respect to search. Improved searching also reduces the time it takes a user to find and access relevant information, time which may be spent on other productive activities.

Figure 1:
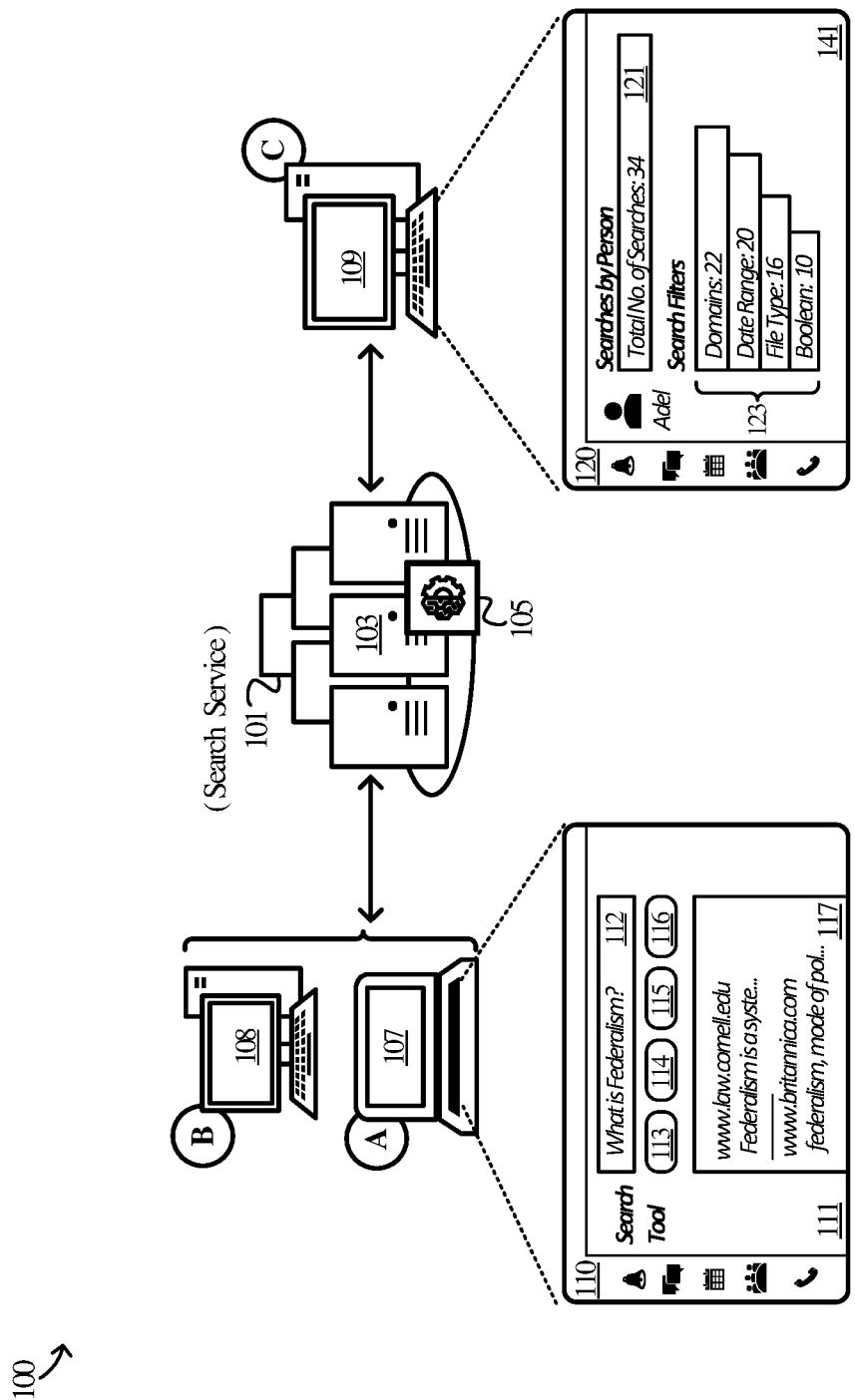
FIG. 1 illustrates an operational environment in an implementation.
Figure 7:
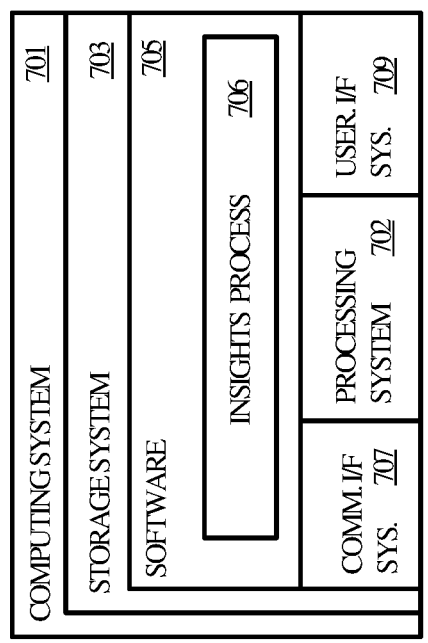
FIG. 7 illustrates a computing system suitable for implementing the various operational environments, architectures, processes, scenarios, and sequences discussed below with respect to the other Figures.

FIG. 1 illustrates an operational environment 100 in an implementation of insights for search engine utilization. Operational environment 100 includes search service 101, computing devices 107 and 108, and computing device 109. Search service 101 employs one or more server computers 103 co-located or distributed across one or more data centers connected to computing devices 107, 108, and 109. Example servers include web servers, application servers, virtual or physical servers, or any combination or variation thereof, of which computing device 701 in FIG. 7 is broadly representative.

Computing devices 107-109 communicate with search service 101 via one or more internets and intranets, the Internet, wired and wireless networks, local area networks (LANs), wide area networks (WANs), or any other type of network or combination thereof. Examples of computing devices 107-109 include personal computers, tablet computers, mobile phones, gaming consoles, wearable devices, Internet of Things (IoT) devices, and any other suitable devices, of which computing device 701 in FIG. 7 is also broadly representative.

Broadly speaking, search service 101 provides Internet search services to end points such as computing devices 107-108 (and optionally, to computing device 109). Users construct search queries in the context of search tools running on the devices, and the devices supply the queries to search service 101. Search service 101 employs a search engine to perform searches based on the queries and returns results for the users to consume. The users may be, for example: observed users (those whose searching is being observed) and reviewing users (those reviewing the progress of observed users). In some cases, the observed user and the reviewing user may be one in the same.

Search service 101 also employs an insight engine 105 to provide insights into the habits, progress, and/or proficiency of observed users with respect to search queries. For example, search service 101 provides insights to user C on computing device 109 into the queries constructed and submitted by users A and B using computing devices 107 and 108 respectively. Here, user C is a reviewing user, while users A and B are observed users.

A technical improvement to such environments disclosed herein allows users in a supervisory position not only to observe the search prowess of their supervisees, but also to obtain search-related insights about the supervisees that heretofore have not been available. In particular, FIG. 2 illustrates a process employed by search service 101 to collect search signals and supply search-related insights to supervisory personnel, or even to the searchers themselves, in some implementations.

Figure 2:
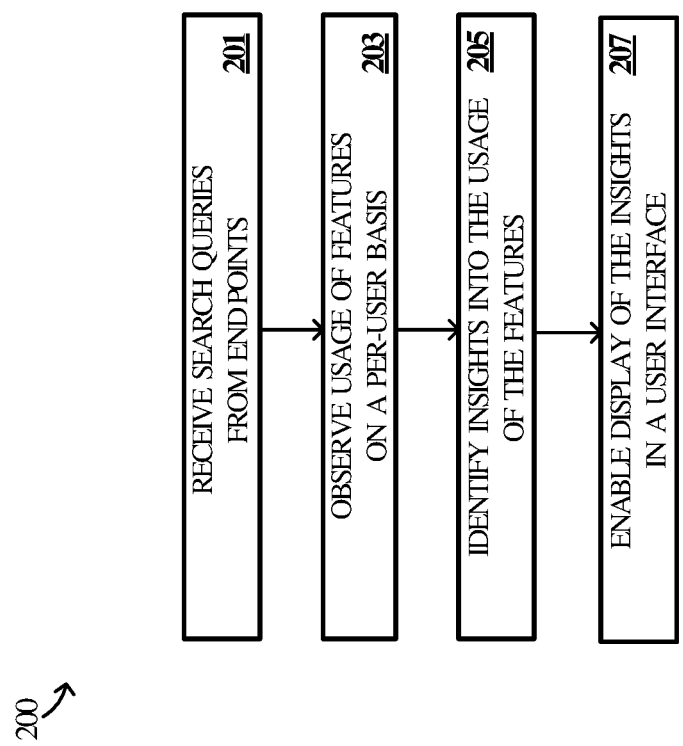
FIG. 2 illustrates an insights process in an implementation.

Turning to FIG. 2, insights process 200 represents a method employed by search service 101 to generate and distribute search-related insights. Insights process 200 is implemented in program instructions in the context of a software application, service, micro-service, or combination thereof running on any of the computing devices that provide search service 101. The program instructions direct the computing devices to operate as follows, referring to a computing device in the singular for the sake of simplicity.

To begin, a computing device subject to insights process 200 observes, on a per-user basis with respect to each user in a group of observed users, usage of features of a search engine over a period of time in association with queries submitted to the search engine (step 201). For example, the usage of filter operators may be observed and detected be detected by parsing incoming search queries for indications that a filter operator was used. For instance, Boolean terms such as AND as well as OR may be present in the text of a search query. Other operators, such as domain identifiers, region identifiers, and timeframe identifiers region identifiers, may also be present and detectable by parsing the text of a given search query.

Other features include category filters that allow a user to filter results by audio, video, places, and shopping information. In some contexts, such as travel-related searches, the search engine features may include filter operators related to travel dates, travel costs, airline details, flight details, flight duration, and connection information. Still other features include auto-suggest controls, keyword suggestions, and the like, all of which may be observed.

Other techniques may also be employed to detect the usage of filter operators. For example, an application programming interface (API) to a search engine may accept filter operators separate from the literal text of a search query itself. In such cases, the filter operators may be identified separately from the text string entered by a user into a search box. Still other techniques may be employed including an entirely different API configured to report the usage of filter operators out-of-band with respect to the API used to submit a query to a search engine. For example, a search interface may communicate a search query to a search engine via one API, while an application interface separate from the search interface may communicate a report via a different API indicative of the filter operators used to construct the search query.

The computing device also identifies, on a per-user basis with respect to each of the group of observed users, one or more insights into the usage of search engine features (e.g., filter operators) over the period of time (step 203). For example, the computing device may count the total number of queries made by a user within the timeframe, as well as the number of times a given filter operator was used. Similarly, the usage of filter operators may be broken down over the time period by days, weeks, or other units. Example insights include information indicating raw counts, percentages, and trends over a time period. A trend would show, for example, an increase (or decrease) in usage of a filter by an observed user from the beginning of the period to the end.

It may be appreciated that the insights need not focus on (or even include) aspects related to search engine features in general, nor filter operators more specifically. For example, the insights may relate to search terms used and click-throughs associated with specific search terms and search strings. That is, the insights need not include information related to which search engine features were used to construct the queries (much less which filter operators), but may pertain to the search strings, their corresponding results, and click-through information for those results.

Additional insights may relate to the search results returned to an observed user and the user's interactions with the search results. For example, the computing device may detect a user's response to a set of search results, such as whether the user clicks on (or otherwise selects) any of the search results, which search result is selected, and so on. The search environment within which the user makes selections may communicate the selections to the search service to allow the user's responses to be observed. That is, the application, browser, or other such environment in which the user consumes the search results may request a link indicated in a particular result from the search service itself, allowing the search service to observe which links are selected. Alternatively, the user's search environment may access the search results outside of the context of the search service, in which case the search environment may observe and report the user's responses out-of-band with respect to clicking-through to a link.

Finally, the computing device (subject to insights process 200) enables display of the one or more insights in a user interface (Step 205). Enabling display of the insights may include, for example, sending information indicative of the insights to a client device for display in a user interface associated with a reviewing user. The information may be sent in the context of a webpage, an image, or another object or collection of objects that may be rendered in a user interface on an end point.

Referring back to FIG. 1, the following describes an application of insights process 200 with respect to the elements of operational environment 100. In operation, a search tool running computing device 107 causes the computing device to display search interface 111. User A, operating computing device 107, enters a search query in search interface 111. Search interface 111 is provided in the context of user interface 110 and provides an interface to search service. User interface 110 itself provides an interface to a software application or environment such as a collaboration application, a productivity application, an operating system, or the like. The search tool that provides search interface 111 may be a component of said applications or operating system, an add-in to an application, or a stand-alone application.

Search interface 111 includes a search box 112 in which an observed user may type or otherwise enter a search query. Other modes of data entry include speech, gestures, accessibility modes, or the like. Search interface 111 includes filter controls 113-116 that the user may leverage to refine search queries. Example controls include a Boolean control, a domain control, a regional control, and a timeframe control. The Boolean control is used to add Boolean operators to the search query; the domain control is used to restrict search results to select Internet domains; the regional control is used to restrict search results to specific geographic or jurisdictional boundaries; and the timeframe control is used to filter results based on time and date. Other filter controls in addition to—or in place of—those disclosed herein may also be used. In addition, other controls corresponding to other features are also possible in addition to—or in place of—the filter controls disclosed herein. For example, search interface 111 may include a keyword control selectable to obtain keyword suggestions for a query.

User A enters search terms into search box 112 and may (or may not) enhance the search by using one or more of filter controls 113-116. Once the query is complete, the search tool that provides search interface 111 sends the search query to search service 101. Search service 101 submits the query to a search engine and returns results of the search to computing device 107. The results of the search are displayed in a results section 117 of search interface 111. User A may scan, click-on, or otherwise consume the search results.

While illustrated with respect to user A and computing device 107, it may be appreciated that the same or similar functionality may be provided by a search interface and application on computing device 108 in association with user B. Search service 101 observes the searches performed by user B over time, as well as those performed by user A, and employs insights engine 105 to analyze usage patterns in the observed data.

Indeed, search service 101 may obtain usage data for a group of observed users such as a class, a corporate department, or the like. Search service 101 employs insights engine 105 to identify trends in the usage patterns both with respect to the group as well as on a per-user basis. The insights may then be provided to a reviewing user to consume with respect to a particular group of individuals. Here, search service 101 communicates with computing device 109 to deliver insights related to users A and B, which may then be displayed in user interface 120.

User interface 120 may also provide an interface to a software application or environment such as a collaboration application or a productivity application. User interface 120 includes insights interface 141 in which the insights provided by search service 101 may be displayed. In this example, insights interface 141 includes insights 121 and 123 pertaining to user A ("Adel"). For example, insight 121 indicates a total number of searches performed by user A over a period of time (34), while insight 123 details which search features were used in the context of those searches.

For instance, a domain filter was used the most (22 times), followed by a timeframe filter (20), a file type filter (16), and Boolean filters (10).

Figure 3:
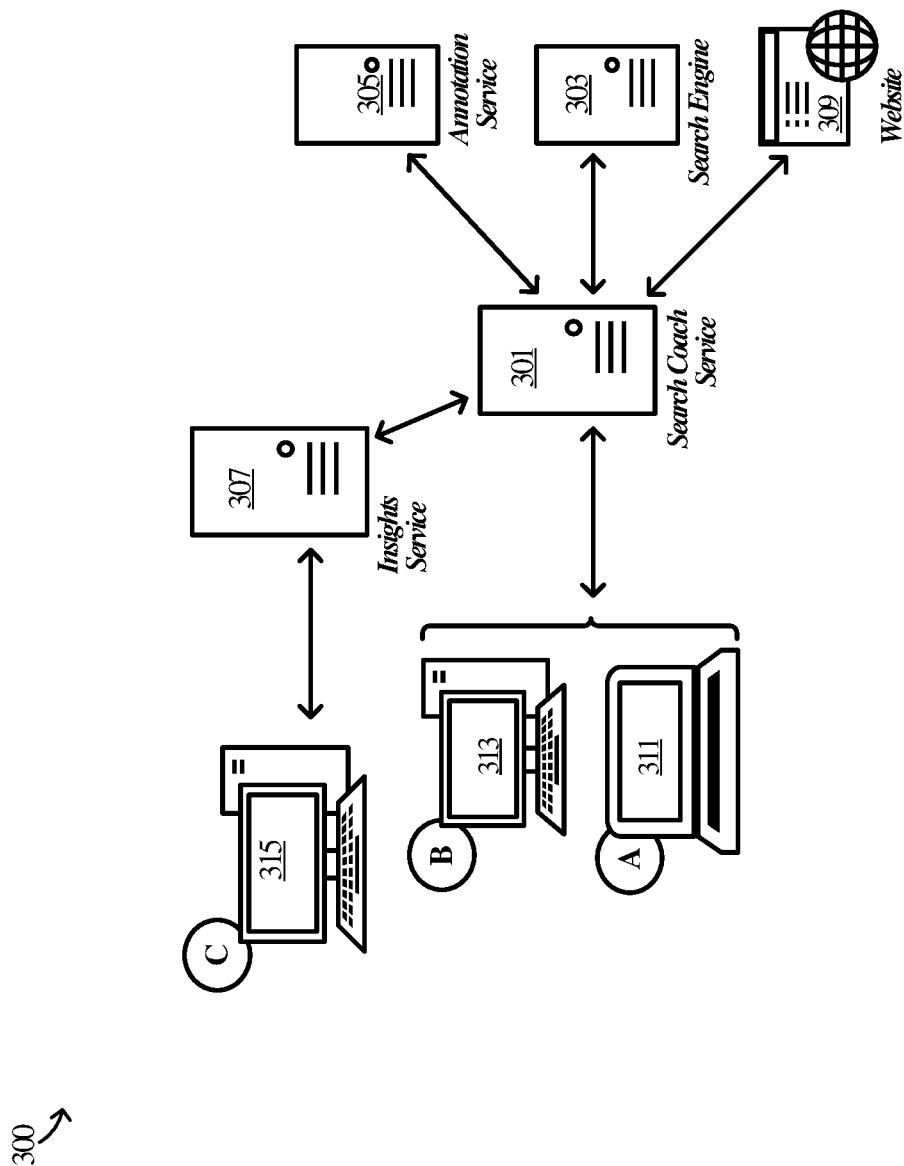
FIG. 3 illustrates an operational environment in an implementation.

FIG. 3 illustrates operational environment 300 in another implementation of insights for search engine utilization. Operational environment 300 includes search coach service 301, search engine 303, annotation service 305, and insights service 307. Operational environment 300 also includes computing devices 311-315, which interface with one or more of the aforementioned components of the environment.

Search coach service 301, search engine 303, annotation service 305, and insights service 307 are each representative of software services, micro-services, or the like, implemented on one or more server computers co-located or distributed across one or more data centers connected to computing devices 311-315. Example servers include web servers, application servers, virtual or physical servers, or any combination or variation thereof, of which computing device 701 in FIG. 7 is again broadly representative.

Computing devices 311-315 communicate with one or more of search coach service 301, search engine 303, annotation service 305, and insights service 307 via one or more internets and intranets, the Internet, wired and wireless networks, LANs, WANs, or any other type of network or combination thereof. Examples of computing devices 311-315 include personal computers, tablet computers, mobile phones, gaming consoles, wearable devices, IoT devices, and any other suitable devices, of which computing device 701 in FIG. 7 is also broadly representative.

Search coach service 301 provides an interface through which search tools on computing devices 313 and 315 access search engine 303 to perform Internet searches. Search engine 303 is representative of a search engine capable of indexing and searching web pages and other Internet resources based on search queries generated by end points such as computing devices 313 and 315. Annotation service 305 is representative of a service capable of annotating search results at the request of search coach service 301 to provide context with respect to the search results. For example, annotation service 305 may identify specific results as more or less reliable sources of the information being sought by a specific query.

Insights service 307 is representative of a service capable of observing the usage of filter operators by observed users, analyzing the usage and delivering relevant insights about their usage. Insights service 307 communicates with search coach service 301 either in-line or out-of-band with respect to search queries flowing through the service to obtain indications of the filter operators being used. For example, insights service 307 may obtain copies of the search queries, allowing insights service 307 to parse the queries to determine which filter operators were used. Alternatively, search coach service 301 may record and categorize the queries, allowing insights service 307 to subscribe to specific datasets such as information indicative of which filter operators were used by which users, and when. In any case, insights service 307 develops a record of usage on a per-user basis that it may then leverage when developing insights.

Figure 4:
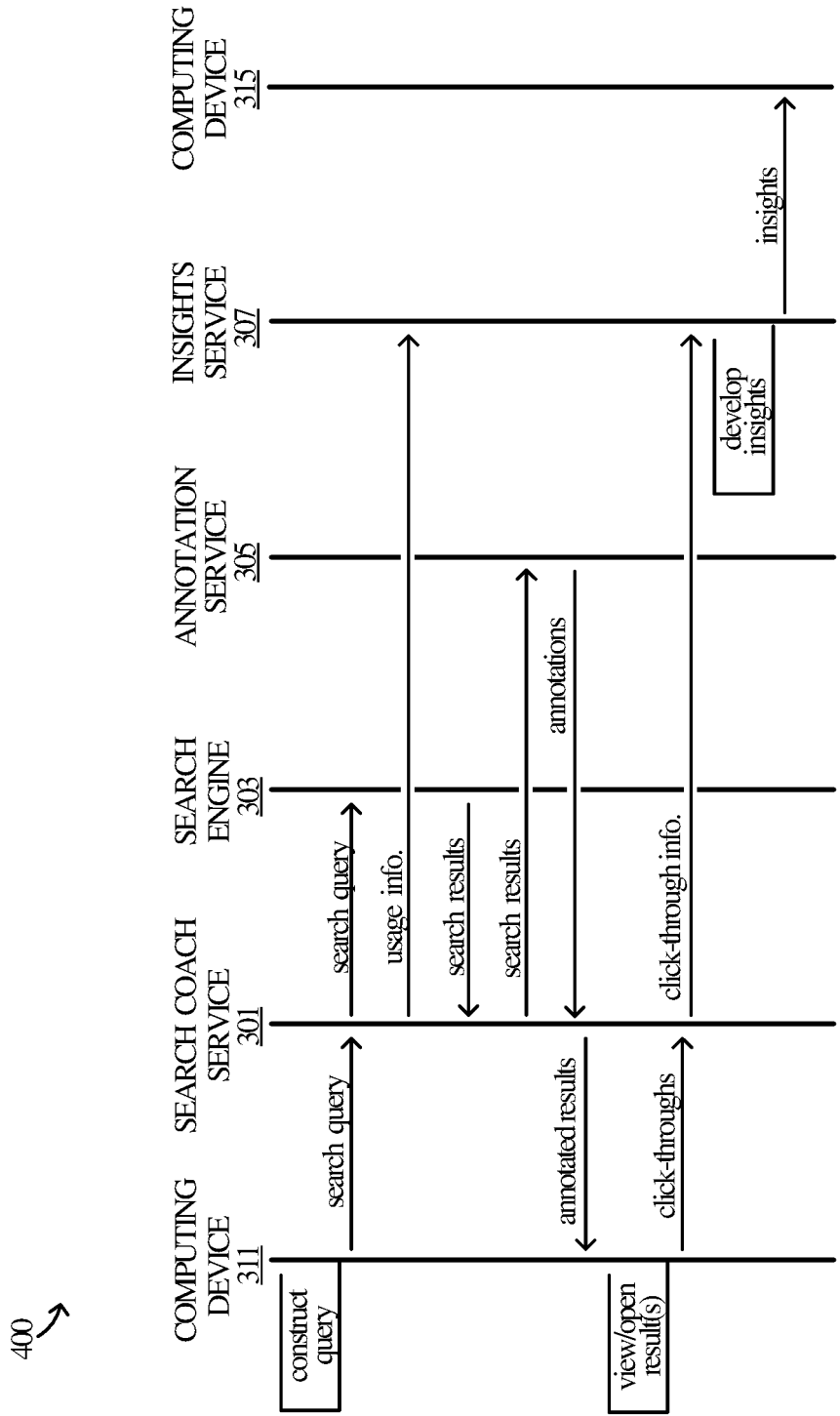
FIG. 4 illustrates an operational scenario in an implementation.

FIG. 4 illustrates a brief operational scenario 400 to highlight the interactions of the various components of operational environment 300 in the context of providing insights with respect to search engine utilization. In operation, users A and B construct queries in the context of a search interface on their respective computers. Limiting the discussion to user A for purposes of simplicity, computing device 311 sends a search query to search coach service 301. Search coach service 301 forwards to the query to search engine 303. Search engine 303 conducts a search based on the query and returns search results to search coach service 301.

Search coach service 301 also sends usage information to insights service 307. The usage information indicates which filter operators—if any—were present in the search, which indicates to insights service 307 which filter controls were used to construct the query. As mentioned, the usage information may take the form of a copy of the query, discrete information extracted from the search query by search coach service 301, or even information supplied by the search interface on computing device 311 out-of-band with respect to the search query itself.

Upon receiving the search results, search coach service 301 supplies the results to annotation service 305. Annotation service 305 evaluates the results to annotate at least some of the results with supplementary information indicative of the trustworthiness of the source of a result. It may be appreciated that annotation service 305 is optional and need not be included in the workflow disclosed herein. In addition, annotation service 305 could be consulted by search engine 303 prior to it returning search results to search coach service 301.

In either case, annotated (or unannotated) search results are returned by search coach service 301 to computing device 311 for display to—and consumption by—user A. User A considers the results and may click on one or more (or none) of the results.

As user A clicks-through to results, computing device 311 requests the content indicated in the results from the websites that host the content. Website 309 in FIG. 3 is broadly representative of one such website. Website 309 (or any other website) may be accessed through search coach service 301 or through alternative channels. In the first case, the search interface on computing device 311 may request content from the search results via search coach service 301, allowing search coach service 301 to record that user A selected one of the search results. In the second case, the search interface may be programmed to report to search coach service 301 that the user clicked on a result, even if a different service separate from search coach service 301 is used to resolve the request or otherwise.

Search coach service 301 receives the indications of the click-throughs and reports them to insights service 307. Insights service 307 is therefore able to consider the response by user A to the search results generated based on the search query. In the aggregate over a period f time, insights service 307 is able to develop an understanding of whether user A is utilizing the various features and capabilities of search engine 303, and to what extent, based on an analysis of the usage information provided by search coach service 301. The usage information includes not only information about the filter operators supported by search engine 303, but also whether a given search was successful as evidenced by the user's click-throughs on the search results, as explained in additional detail below.

Insights service 307 provides the insights to user C on computing device 315. User C may be, for example, a teacher in an educational setting whereby the teacher desires to understand the proficiency of a group of students with respect to Internet searches. User C may also be a supervisor or peer in a corporate or other such setting, where the user desires to observe the progress of other users with respect to their searching proficiency. The insights may also be returned directly to user A in a purely individual experience, so that user A may learn directly from the insights. The insights may include, for example, how often a specific user uses specific filter operators during specific periods of time. A reviewing user may thus gain an understanding of whether an observed user has increased their usage of such operators which typically would result in higher-quality searches and improved search results.

Indeed, improved search results may be indicated by an uptick in click-throughs that coincides with increased usage of filter operators by an observed user. A regression may also be evident in the user's interaction with search results. That is, a reduction in click-throughs may indicate poor search results driven by the misuse or underuse of filter operators. A teacher, supervisor, or other person who is made aware of such insights may take steps to remedy the situation by providing the observed user with specific instruction or encouragement with respect to filter operators. In some cases, the feedback may be automated whereby tailored messages are delivered to the observed user that explain the filter operators and encourage their use.

In addition, the observed user's search interface may include automation features that assist with improving upon the insights. For instance, a search coach bot may be available through a user's search interface that highlights to the observed user the presence of filter controls. The bot may also provide instruction with respect to how to use the search filters based on feedback provided by insights service 307. For example, in addition to providing insights to a reviewing user, insights service 307 may feed the insights to a bot associated with an observed user (e.g., user A) such that the user may receive specific instruction from the bot that is tailored to the insights.

As mentioned above, various technical effects are accomplished by insights service 307. In one example, the insights provided to user C (a reviewing user) may form the basis for improved instruction with respect to searching skills and techniques. The improved instruction, when applied to observed users (e.g., users A and B) results in improved search queries. In turn, the improved search queries reduce search churn by driving improved search results, and a reduction in search churn reduces the compute resources required of search engine 303 in the aggregate.

A reduction in search churn may reduce demand on a global scale for the energy required to power modern search engines. At a more local level, reduced search churn consumes less battery power (e.g., on mobile devices) since fewer searches are needed, to say nothing of improving the basic user experience with respect to search. Improved searching also reduces the time it takes an observed user to find and access relevant information, time which may be spent on other productive activities.

Figure 5:
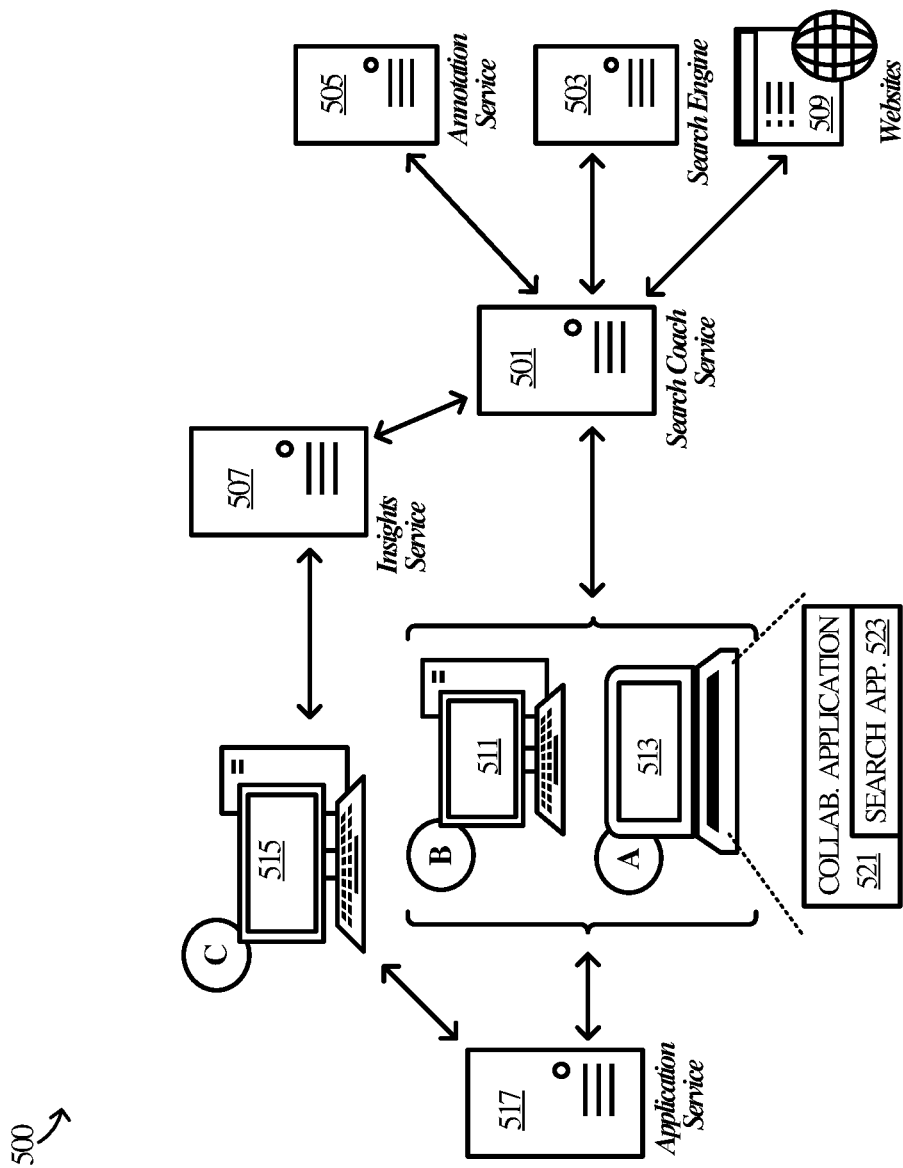
FIG. 5 illustrates an operational environment in an implementation.

FIG. 5 illustrates operational environment 500 in an alternative implementation of insights for search engine utilization. Operational environment 500 is similar to operational environment 300, except that it includes an integration with an application service. In particular, operational environment 500 includes search coach service 501, search engine 503, annotation service 505, insights service 507, and application service 517. Operational environment 500 also includes computing devices 511-515, which interface with one or more of the aforementioned components of the environment.

Search coach service 501, search engine 503, annotation service 505, and insights service 507 are each representative of software services, micro-services, or the like, implemented on one or more server computers co-located or distributed across one or more data centers connected to computing devices 511-515. Application service 517 is also representative of a software service, micro-service, or other such applications implemented on one or more server computers co-located or distributed across one or more data centers connected to computing devices 511-515. Example servers include web servers, application servers, virtual or physical, or any combination or variation thereof, of which computing device 701 in FIG. 7 is again broadly representative.

Computing devices 511-515 communicate with one or more of search coach service 501, search engine 503, annotation service 505, insights service 507, and application service 517 via one or more internets and intranets, the Internet, wired and wireless networks, LANs, WANs, or any other type of network or combination thereof. Examples of computing devices 511-515 include personal computers, tablet computers, mobile phones, gaming consoles, wearable devices, IoT devices, and any other suitable devices, of which computing device 701 in FIG. 7 is also broadly representative.

Search coach service 501 provides an interface through which search tools on computing devices 513 and 515 access search engine 503 to perform Internet searches. Search engine 503 is representative of a search engine capable of indexing and searching web pages and other Internet resources based on search queries generated by end points such as computing devices 513 and 515. Annotation service 505 is representative of a service capable of annotating search results at the request of search coach service 501 to provide context with respect to the search results. For example, annotation service 505 may identify specific results as more or less reliable sources of the information being sought by a specific query.

Insights service 507 is representative of a service capable of observing the usage of filter operators by users, analyzing the usage and delivering relevant insights about their usage. Insights service 507 communicates with search coach service 501 either in-line or out-of-band with respect to search queries flowing through the service to obtain indications of the filter operators being used. For example, insights service 507 may obtain copies of the search queries, allowing insights service 507 to parse the queries to determine which filter operators were used. Alternatively, search coach service 501 may record and categorize the queries, allowing insights service 507 to subscribe to specific datasets such as information indicative of which filter operators were used by which observed users, and when. In any case, insights service 507 develops a record of usage on a per-user basis that it may then leverage when developing insights.

Application service 517 is representative of any application provided as a service that users may interface with via corresponding applications on their computing devices. Examples of application service 517 include—but are not limited to—collaboration services, communication services, productivity services, gaming services, and business application services. The local application(s) corresponding to application service 517 (e.g., a collaboration application, productivity application, or the like) are capable of hosting search-related applications in their execution contexts. Here, collaboration application 521 is representative of one such application which hosts a search application 523. An observed user may engage with collaboration application 521 to access its features and functionality. The user may also engage with search application 523—in the context of collaboration application 521—to access its features and functionality (i.e., those of search application 523).

In a brief example, an observed user may engage with collaboration application 521 to chat with other users, make voice or video calls to other users, join conference calls between multiple users, share documents, or otherwise collaborate. Such interactions may involve collaboration application 521 connecting to application service 517 and exchanging data with application service 517. At the same time, the observed user may engage with search application 523 to conduct Internet searches and view search results.

Some reviewing users—such as a teacher, manager, or person in charge of a group—may experience search application 523 in a supervisory mode. In the supervisory mode, the reviewing user is provided with insights into the search habits, patterns, and proficiency of the users in the group. FIGS. 6A-6H illustrate a user experience 600 in an education-based scenario to demonstrate various facets of the search engine insights disclosed herein, although it may be appreciated that the concepts apply as well to other settings, situations, and scenarios.

Figure 6A:
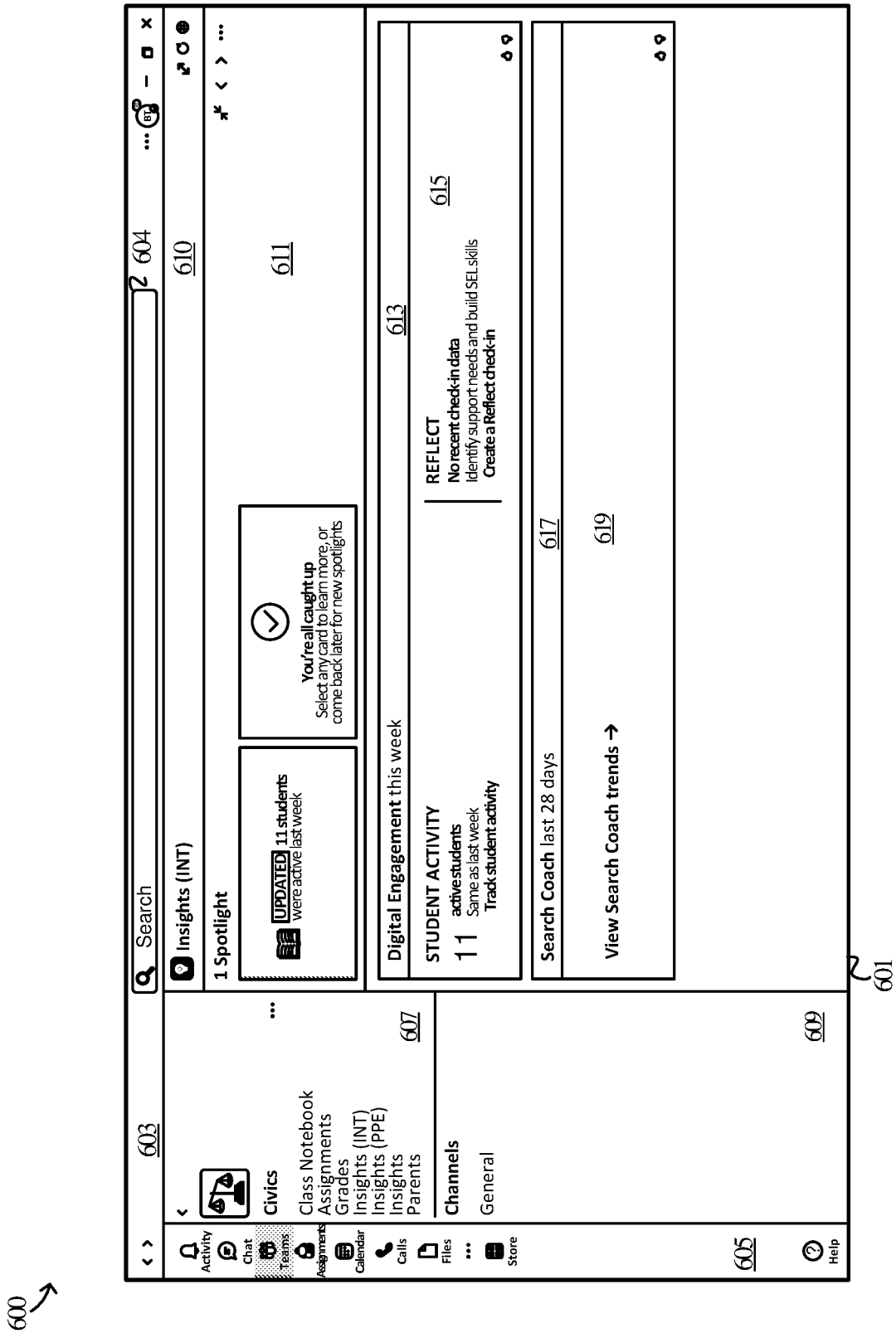

Referring to FIG. 6A, user experience 600 illustrates a user interface 601 generated and displayed on a computing device (e.g., computing device 515 operated by user C). User interface 601 includes components associated with a collaboration application (e.g., collaboration application 521 in FIG. 5) including components 603, 605, 609, and 607. Component 603 is representative of a main title bar that allows a reviewing user to open, close, minimize, or maximize user interface 601. Component 603 includes a search box 604 via which a user may input search queries with respect to content in the collaboration application such as documents, contacts, and other material.

Component 605 is representative of a feature bar that includes various icons for accessing modules of the application. For instance, component 605 includes an activity icon for checking alerts or reminders, a chat icon for chatting with other users, a teams icon for accessing team-oriented flows, an assignments icon for posting and reviewing assignments, a calendar icon for accessing a calendar feature, a call icon for placing voice calls, a files icon for managing files, and a store icon for accessing an app store. In some implementations, component 605 may include an icon for accessing an insights module, an insights add-in application, or the like.

The app store—accessible via the store icon—provides the user with the ability to download and install "add-in" applications that are integrated into the context of the main application. Here, it is assumed for exemplary purposes that the user has installed an insights application through the store (or by some other mechanism). The insights application is akin to search application 523, in that it is loaded and executed in the context of another application. Thus, user interface 601 also includes various components associated with the insights application such as components 610-611. As mentioned, the insights application may be launched from an icon in component 605. Alternatively, the insights application may be launched from an icon or button in component 605. In still other implementations, the insights application may be provided as a feature of existing functionality of the collaboration application.

Component 610 is representative of a title bar that identifies the insights application and allows the reviewing user to expand, shrink, and refresh the add-in application. Component 611 is representative of a display frame through which recent and/or highlighted information about a group may be surfaced. Here, it is assumed for exemplary purposes that the insights application is being used to observe the progress of eleven (11) students who are using corresponding student versions of the insights application to conduct Internet searches. Student internet searches are captured by a search coach service (e.g., search coach service 501) and reported to an insights service (e.g., insights service 507). In turn, the insights service develops insights on a per-user basis and feeds those insights to a computing device (e.g., computing device 515) to be surface in a user interface, such as that illustrated herein with respect to FIGS. 6A-6G.

Continuing with user experience 600, component 613 in FIG. 6A is representative of another display frame in which user activity over a certain time period, e.g., in the past week, is reported. The reviewing user may click into component 615 to view details of user activity in the past week. Similarly, component 617 is a display frame that indicates user activity over another time period, e.g., in the past 28 days. The reviewing user may click into component 619 to navigate to a detailed view of user activity for the past 28 days, which is illustrated in FIG. 6B.

Figure 6B:
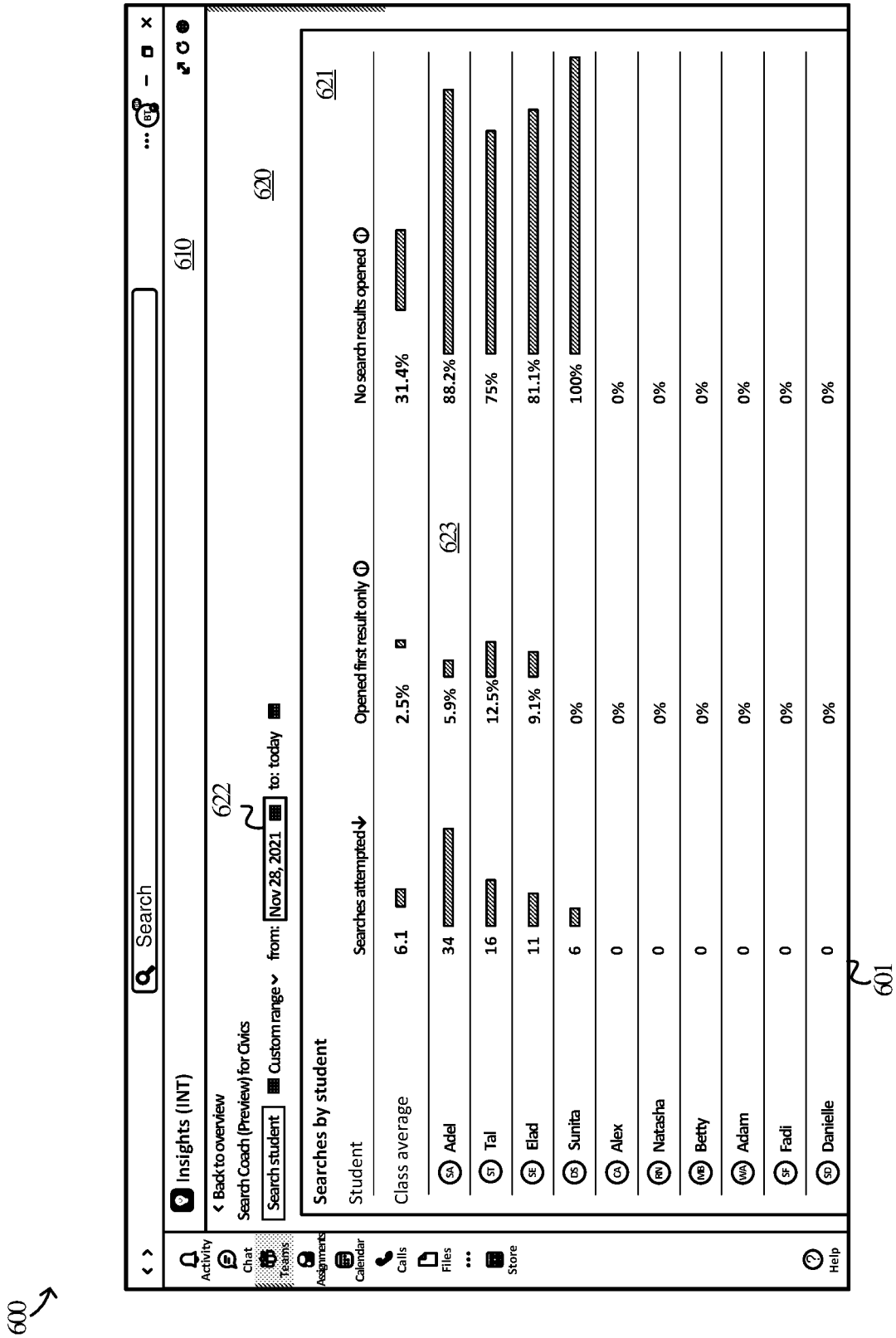

User experience 600 in FIGS. 6B-6F includes detailed usage information and insights associated with the search history of the members of the target group. In FIG. 6B, user interface 601 has transitioned to include component 620, which is representative of a display frame in which usage insights for individuals of the group may be surfaced. Component 620 includes a calendar component 622 for configuring the timeframe in which search histories and insights are displayed. Here, the timeframe ranges from Nov. 28, 2021, to the present.

Component 621 is a display frame in which the insights are surfaced for each observed user. The insights include various metrics such as the number of searches attempted by each observed user, the percentage of searches where only the first result was opened, and the percentage of searches where no results were opened at all. A reviewing user may change the date range via calendar component 622 to obtain insight(s) into the progression of the observed users with respect to searching. For example, early in the history the search results may be low quality, leading to a high percentage where none of the results were opened by an observed user. Later in the history (more recently) as user proficiency has increased, the number of searches resulting in zero click-throughs may decline.

Figure 6C:
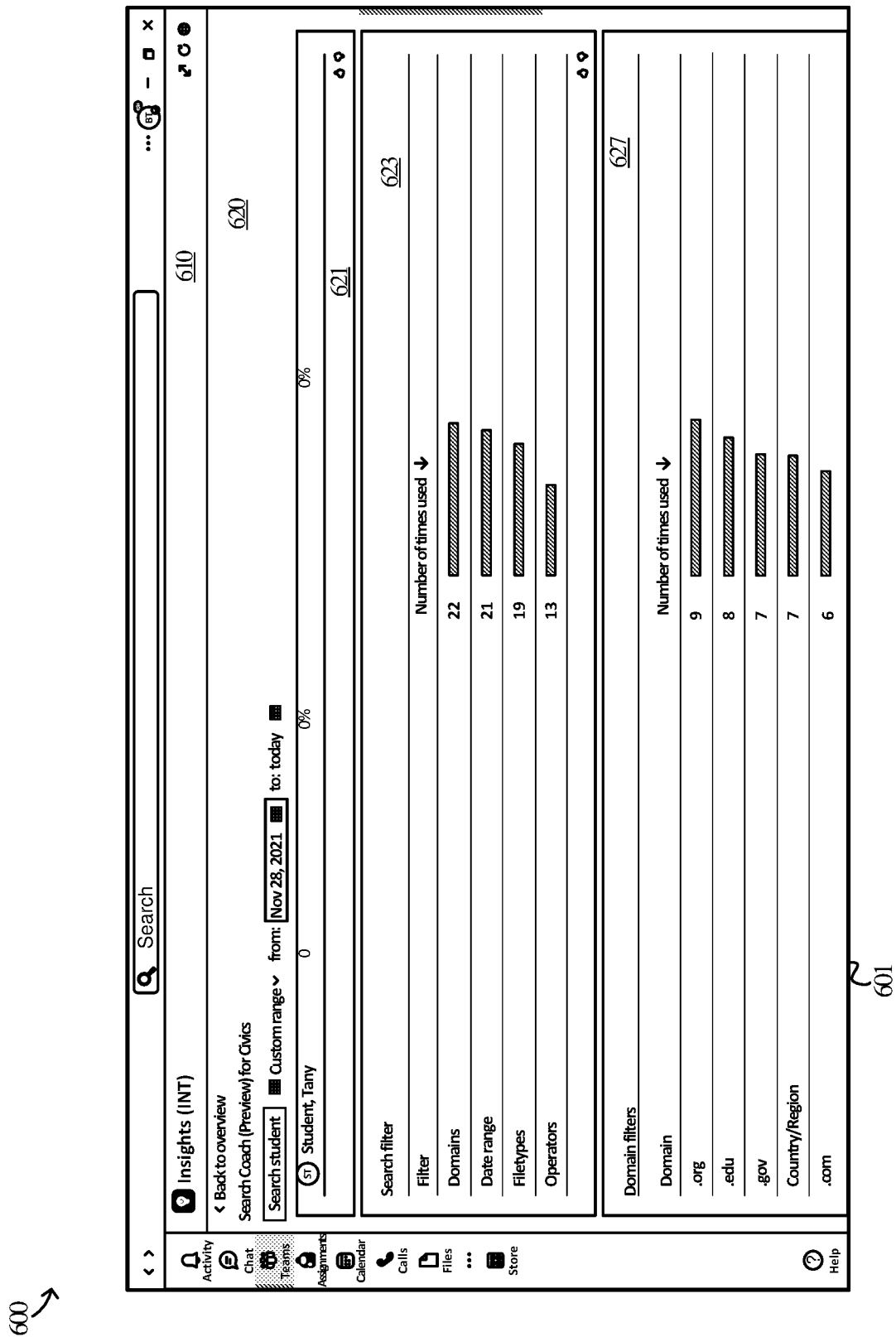

In addition to the statistics shown in component 621, a reviewing user may scroll down to access component 623 and component 627 shown in FIG. 6C. Component 623 includes insights related to filter operators used in the searches groupwide. Specifically, component 623 displays the number of times specific filter operators were used including a domain filter, a date range (timeframe) filter, a file-type filter, and a Boolean operator filter. As with component 621, the reviewing user may filter the insights by adjusting the date range in calendar component 622.

Component 627 illustrates insights pertaining to the usage of domain filters groupwide. Here, the use of specific Internet domains as filters is documented, including the .org domain, the .edu domain, the .gov domain, the .com domain, and country/region domains.

Figure 6D:
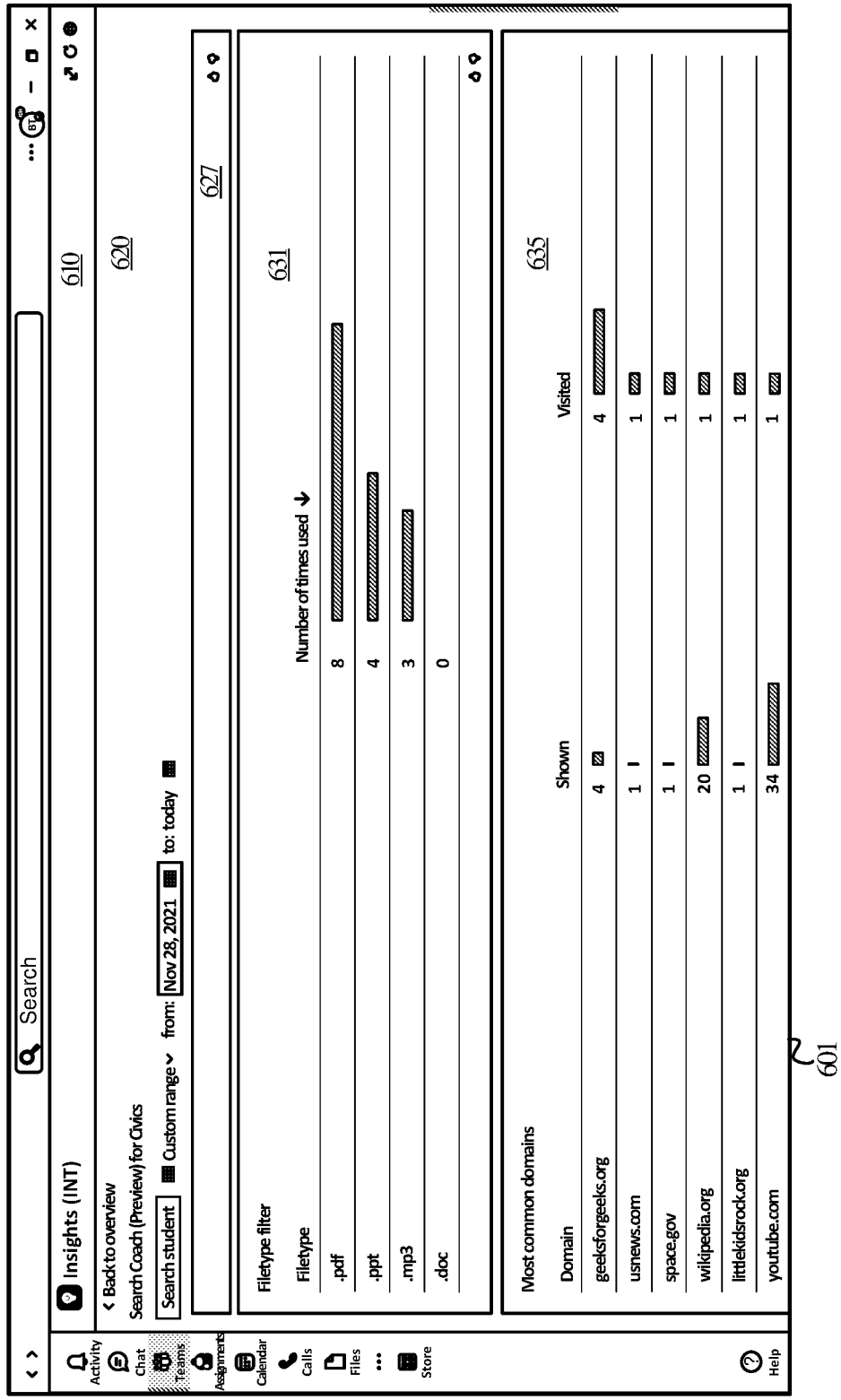

As shown in FIG. 6D, the reviewing user may scroll down even further to view components 631 and 635. Component 631 is representative of a display frame in which insights related to file-type filters are displayed. Here, a count is displayed indicative of the number of times the observed users filtered search results based on file-types including the .pdf type, the .ppt type, the .mp3 type, and the .doc type.

Component 635 is representative of a display frame in which insights related to specific domains are displayed. Here, a count is displayed indicative of the number of times the observed users visited specific domains returned in the search results. As with the other display components, the reviewing user may filter the insights using calendar component 622.

Figure 6E:
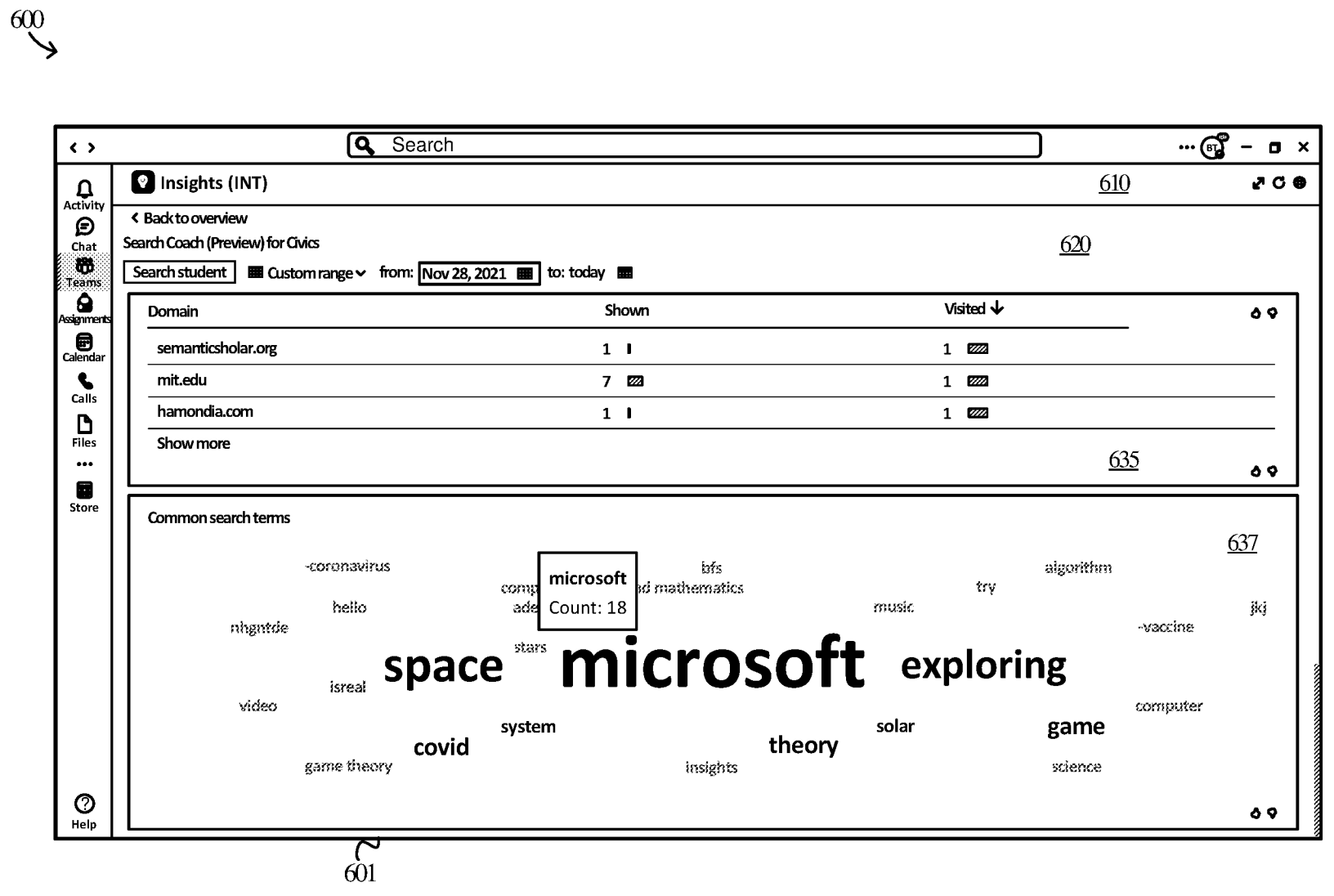

Component 637 in FIG. 6E is representative of a display frame in which a word blob may be displayed. The word blob is indicative of the query terms used by the observed users over a particular period of time. The larger the word, the more frequently the word was used as a query term. The reviewing user may adjust the period over which the word blob is constructed by adjusting the dates in calendar component 622. Upon selection of a displayed term, a count of searches that included the term may be displayed. For example, here the reviewer has clicked on the term "Microsoft," causing a count of "18" to be displayed. In addition, if a reviewer selects a term, they may also be presented with the specific searches that included the term.

Figure 6F:
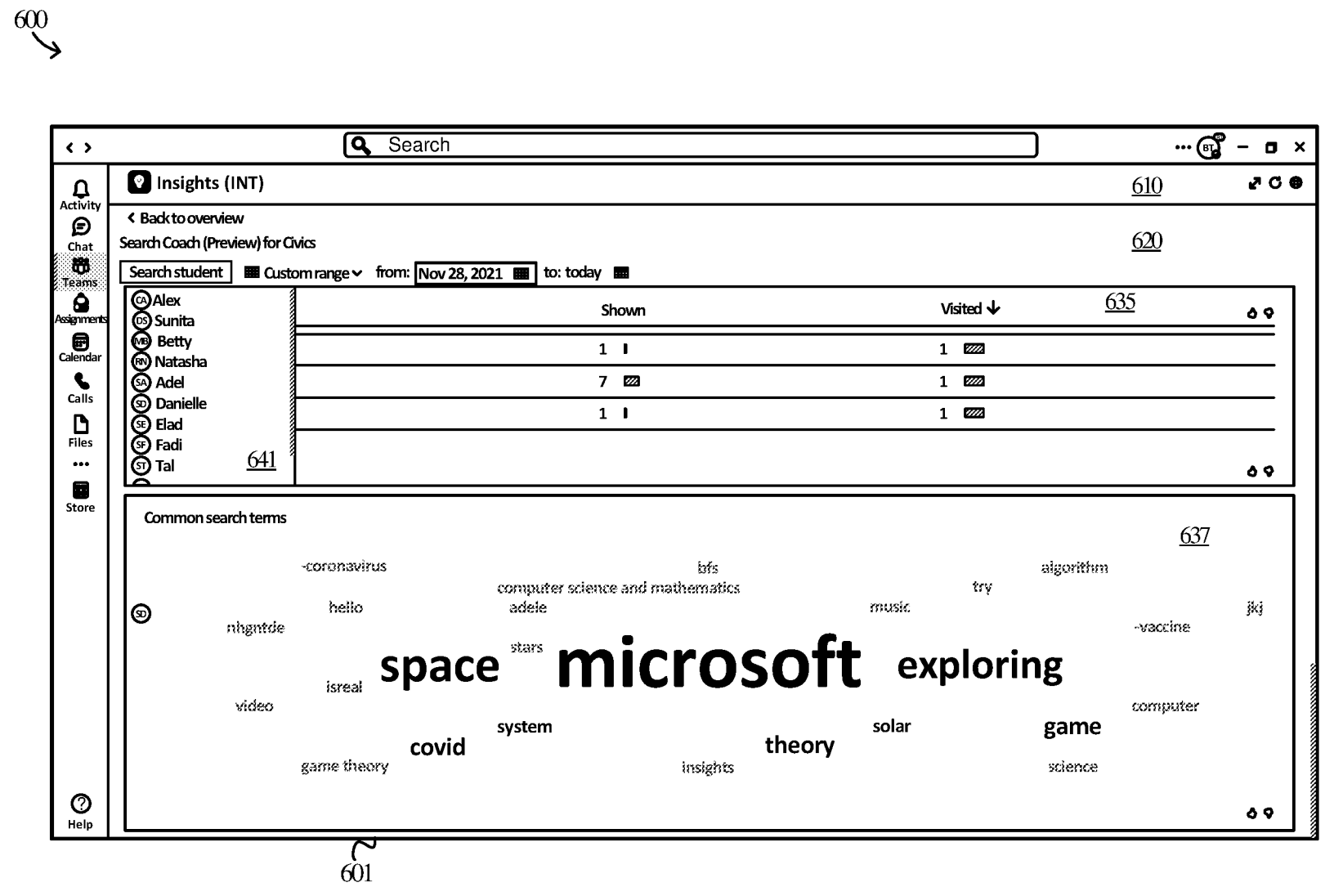

In FIG. 6F, the reviewing user desires to drill-down into usage insights for a specific student. The reviewing user does so via component 641, which is representative of a drop-down menu in which the reviewing user may select the name of a specific student. Here, it is assumed for exemplary purposes that the reviewing user selects Adel. Accordingly, user experience 600 transitions to a state illustrated in FIG. 6G whereby usage insights are provided for Adel.

Figure 6G:
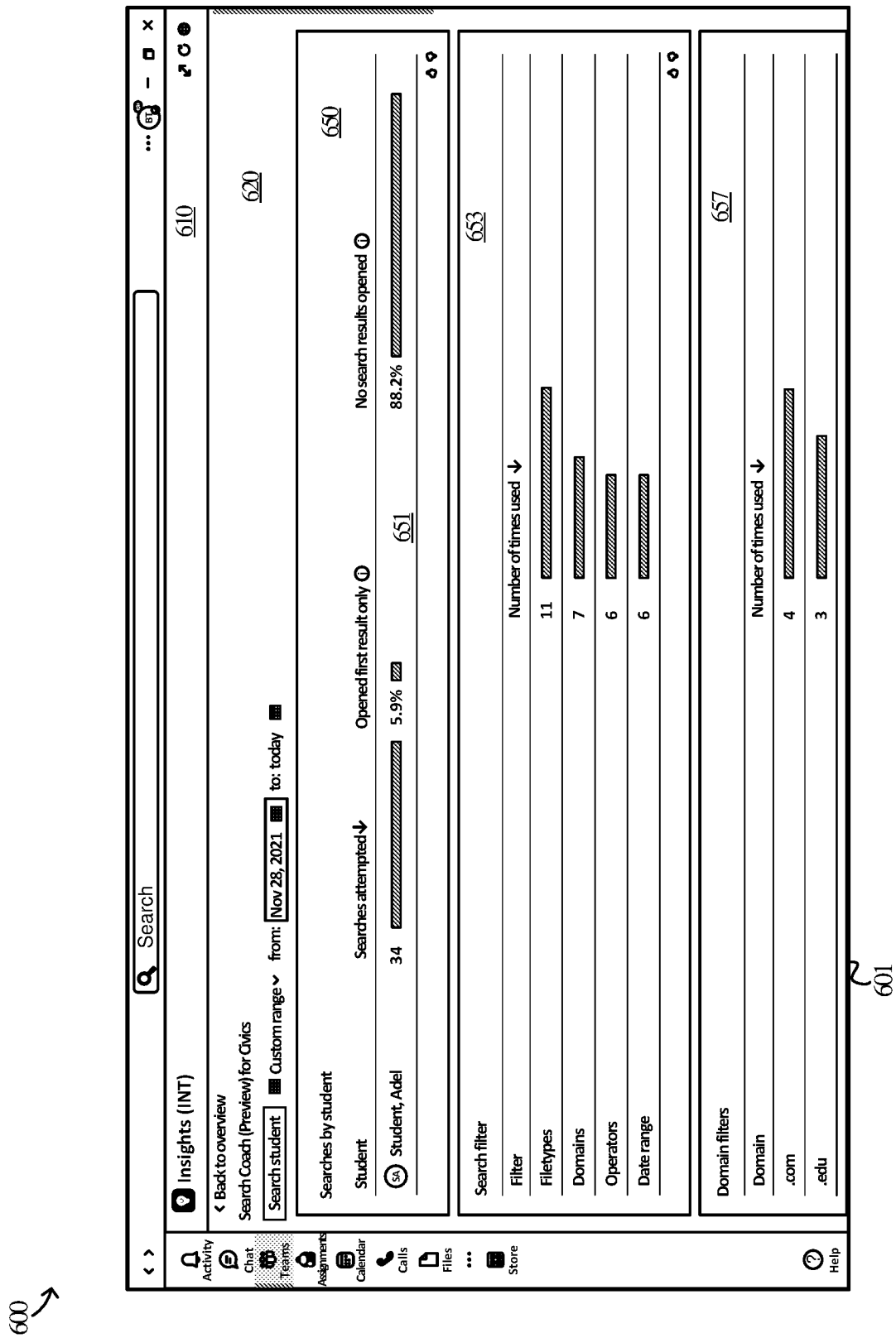

In FIGS. 6G-GH, user interface 600 includes component 650, which is a display frame in which high-level search metrics are provided on a per-user basis (e.g., for Adel). For example, component 650 displays the number of searches (34) conducted by Adel during a time period defined by calendar component 622. Component 650 also identifies the number or percentage of searches (5.9%) where only the first result was opened by Adel, as well as the number or percentage of searches (88.2%) where no results were selected at all.

Further down, component 653 displays how often the observed user (Adel) used various search filters including a file-type filter, a domain filter, Boolean operator filters, and a date range filter. The reviewing user may scroll down further in the user interface to component 657, which details insights at a granular level with respect to the student's user of domain filters.

Figure 6H:
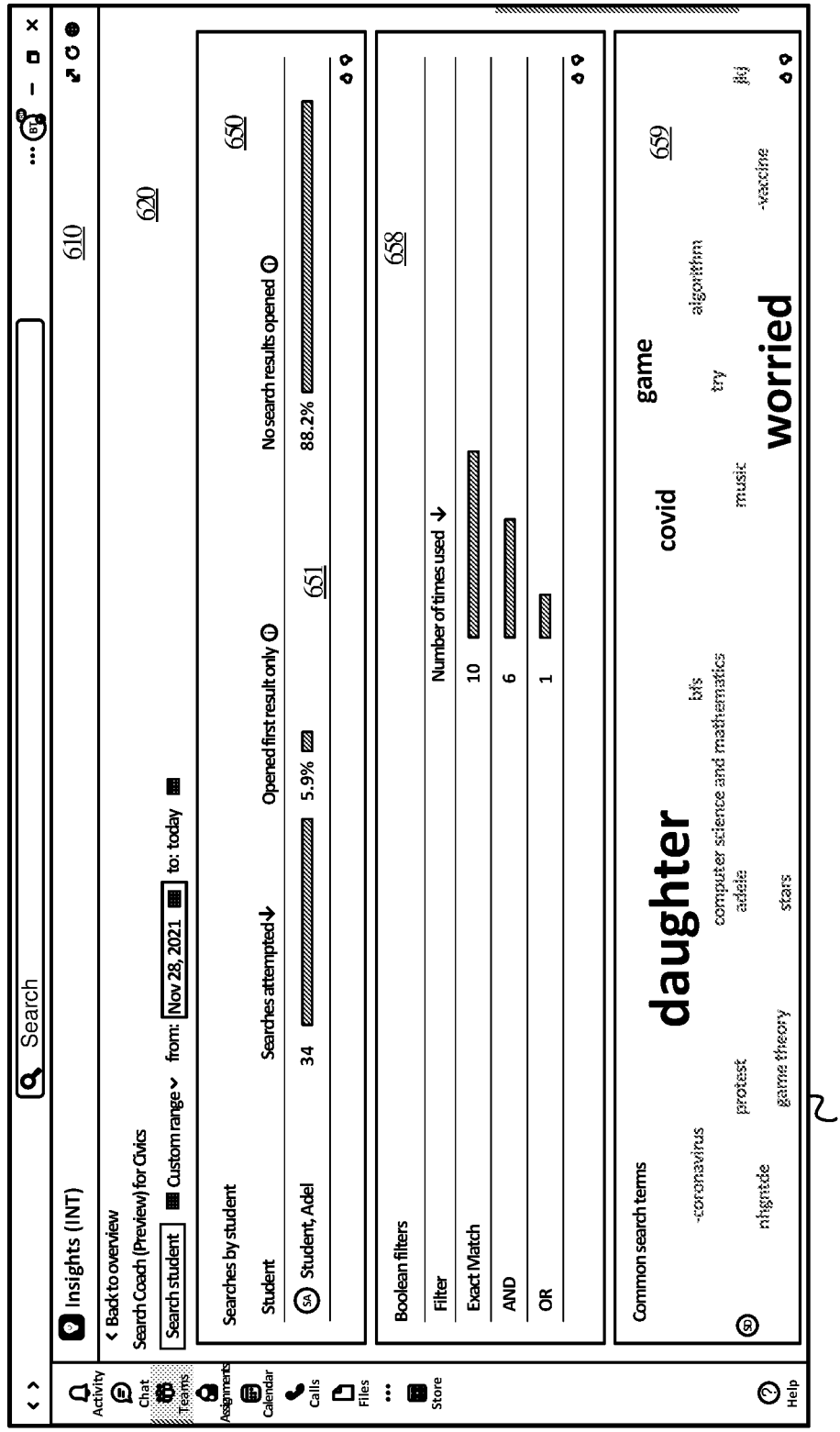

Still further down in FIG. 6H, the user is presented with component 658. Component 658 is a display frame capable of displaying insights related to the use of Boolean operators by the observed student. Component 659 is a word blob that shows the prevalence of various words in the search terms used by the student over a period of time. As with the preceding examples, the reviewing user may adjust the time period under review via calendar component 622, in response to which the insights in the various display components change to reflect usage during the updated time period. For example, the reviewing user may advance forward or move backward in time to ascertain how the target student's usage of the various search filters has progressed (or regressed) over time.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, mobile phones, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements insights process 706, which is representative of insights processes discussed with respect to the preceding Figures, such as insights process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including insights process 706) may be implemented in program instructions and among other functions may, when executed by processing system 702, direct processing system 702 to operate as described with respect to the various operational scenarios, sequences, and processes illustrated herein. For example, software 705 may include program instructions for implementing an insights process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support insights features, functionality, and user experiences. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of insights applications and services, they apply as well to other contexts such as productivity applications and services, gaming applications and services, virtual and augmented reality applications and services, business applications and services, and other types of software applications, services, and environments.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating an insights service improving search engine utilization, the method comprising:
   communicating with a search service to obtain one or more insights into usage of user features of a search engine in association with search queries submitted to the search engine by a group of users over a period of time, wherein the one or more insights are provided by the search service on a per-user basis with respect to each user in the group of users; and
   the one or more insights are indicative of progress by each user in the group of users in a proficiency with using the user features of the search engine when constructing the search queries; and enabling display of the one or more insights in a user interface.

2. The method of claim 1 wherein the user features comprise filter operators, wherein the filter operators correspond to filter controls available in instances of an application selectable by user input to refine the search queries being constructed in a search box of the application, and wherein the filter operators comprise a Boolean operator, a domain operator, a region operator, and a timeframe operator.

3. The method of claim 2 wherein the filter controls include a Boolean control selectable to employ the Boolean operator, a domain control selectable to employ the domain operator, a region control selectable to employ the region operator, and a timeframe control selectable to employ the timeframe operator.

4. The method of claim 3 wherein the Boolean operator narrows the search queries to specific Boolean combinations of search terms, wherein the domain operator narrows the search queries to specific Internet domains, wherein the region operator narrows the search queries to specific geographic regions, and wherein the timeframe operator narrows the search queries to specific timeframes.

5. The method of claim 2 wherein proficiency with using the user features is indicative of user proficiency with using one or more of the filter operators of the search engine.

6. The method of claim 1, wherein the search service observes, on a per-user basis with respect to each user of the group of users, user responses to search results returned by the search engine in response to the search queries.

7. The method of claim 1 wherein the progress is determined based on a change in a rate of click-throughs by each user in the group of users to resources identified in search results returned by the search engine in response to the search queries.

8. The method of claim 1 wherein the user interface comprises a view associated with an instructor role associated with an instructor of the group of users.

9. A computing apparatus comprising:
one or more computer readable storage media;
one or more processors operatively coupled with the one or more computer readable storage media; and
an application comprising program instructions stored on the one or more computer readable storage media that, when executed by the one or more processors, direct the computing apparatus to at least:
communicate with a search service to obtain one or more insights into usage of user features of a search engine in association with search queries submitted to the search engine by a group of users over a period of time, wherein:
the one or more insights are provided by the search service on a per-user basis with respect to each user in the group of users; and
the one or more insights are indicative of progress by each user in the group of users in a proficiency with using the user features of the search engine when constructing the search queries; and
display a view of the one or more insights in a user interface to the application.

10. The computing apparatus of claim 9 wherein the user features comprise filter operators, wherein the filter operators correspond to filter controls used to refine the search queries being constructed in a context of a search box, and wherein the filter operators comprise a Boolean operator, a domain operator, a region operator, and a timeframe operator.

11. The computing apparatus of claim 10 wherein the filter controls include a Boolean control selectable to employ the Boolean operator, a domain control selectable to employ the domain operator, a region control selectable to employ the region operator, and a timeframe control selectable to employ the timeframe operator.

12. The computing apparatus of claim 11 wherein the Boolean operator narrows the search queries to specific Boolean combinations of search terms, wherein the domain operator narrows the search queries to specific Internet domains, wherein the region operator narrows the search queries to specific geographic regions, and wherein the timeframe operator narrows the search queries to specific timeframes.

13. The computing apparatus of claim 10 wherein the proficiency with using the user features is indicative of user proficiency using one or more of the filter operators of the search engine.

14. The computing apparatus of claim 9 wherein the search service observes, on a per-user basis with respect to each user of the group of users, user responses to search results returned by the search engine in response to the search queries.

15. The computing apparatus of claim 9 wherein the progress is determined based on a change in a rate of click-throughs by each user in the group of users to resources identified in search results returned by the search engine in response to the search queries.

16. The computing apparatus of claim 9 wherein the user interface comprises a view associated with an instructor role.

17. One or more computer readable storage media having program instructions stored thereon that, when executed by one or more processors, direct a computing apparatus to at least:
communicate with a search service to obtain, one or more insights into usage of user features of a search engine in association with search queries submitted to the search engine by a group of users over a period of time, wherein:
the one or more insights are provided by the search service on a per-user basis with respect to each user in the group of users; and
the one or more insights are indicative of progress by each user in the group of users in a proficiency with using the user features of the search engine when constructing the search queries; and
enable display of a view of the one or more insights in a user interface to an application.

18. The one or more computer readable storage media of claim 17 wherein the user features comprise filter operators, and wherein the filter operators correspond to filter controls that can be used to refine the search queries being constructed in a context of a search box, and wherein the filter operators comprise a Boolean operator, a domain operator, a region operator, and a timeframe operator.

19. The one or more computer readable storage media of claim 17 wherein the search service observes, on a per-user basis with respect to each user of the group of users, user responses to search results returned by the search engine in response to the search queries.

20. The one or more computer readable storage media of claim 17 wherein the progress is determined based on a change in a rate of click-throughs by each user in the group of users to resources identified in search results returned by the search engine in response to the search queries.

* * * * *